United States Patent
Nuzzi

(10) Patent No.: US 7,475,353 B2
(45) Date of Patent: Jan. 6, 2009

(54) WORLD WIDE WEB RECEIVING DISPLAY STATION WITH A WEB BROWSER GENERATING A GRAPHICAL USER INTERFACE WITH A UNIVERSAL WEB SITE LOGOFF BUTTON ENABLING A BROWSER ROUTINE FOR USER LOGOFF FROM SELECTED WEB SITES

(75) Inventor: Frank A. Nuzzi, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/186,707

(22) Filed: Jul. 21, 2005

(65) Prior Publication Data

US 2007/0022381 A1    Jan. 25, 2007

(51) Int. Cl.
*H04L 9/32* (2006.01)
*G06F 3/00* (2006.01)

(52) U.S. Cl. .................. 715/741; 715/743; 726/8; 705/76

(58) Field of Classification Search ........... 715/741, 715/733, 742, 743, 760; 705/76; 713/168; 726/8
See application file for complete search history.

(56) References Cited

U.S. PATENT DOCUMENTS

| | | | |
|---|---|---|---|
| 5,999,179 A | 12/1999 | Kekic et al. ............. 345/349 |
| 6,314,492 B1 | 11/2001 | Allen et al. ............. 711/135 |
| 6,374,359 B1 | 4/2002 | Shrader et al. .......... 713/201 |
| 6,505,238 B1 * | 1/2003 | Tran ....................... 709/208 |
| 7,093,020 B1 * | 8/2006 | McCarty et al. ......... 709/229 |
| 7,143,437 B2 * | 11/2006 | Royer et al. .................. 726/8 |
| 2001/0034771 A1 | 10/2001 | Hutsch et al. ............ 709/217 |
| 2001/0039504 A1 | 11/2001 | Linberg et al. .............. 705/3 |
| 2002/0085029 A1 | 7/2002 | Ghani ...................... 345/751 |
| 2002/0199002 A1 | 12/2002 | Quimby .................. 709/227 |
| 2003/0033382 A1 | 2/2003 | Bogolea et al. .......... 709/218 |
| 2003/0144948 A1 | 7/2003 | Cleary et al. ............. 705/38 |
| 2003/0195801 A1 | 10/2003 | Takakura et al. .......... 705/14 |
| 2004/0158743 A1 * | 8/2004 | Ham et al. ............... 713/201 |
| 2004/0243507 A1 | 12/2004 | Deane et al. .............. 705/38 |
| 2006/0161848 A1 * | 7/2006 | Stabb et al. .............. 715/741 |
| 2007/0039043 A1 * | 2/2007 | Garskof .................... 726/8 |

* cited by examiner

*Primary Examiner*—Dennis Bonshock
(74) *Attorney, Agent, or Firm*—Herman Rodriguez; Jerry B. Kraft

(57) ABSTRACT

An implementation for a user at a receiving Web station keeping track of logged on Web sites, and a convenient universal logoff interface button to logoff the logged on Web site. The combination of an implementation at a receiving display station generating a GUI including a universal logout button, means associated with said logout button for enabling a user to select a Web site for logout and means at said receiving station responsive to said selection of a Web site for logging said receiving station out of said Web site. The Web browser tracks the Web sites that the user is logged onto, and upon interactive request by the user a menu of logged on Web sites is provided in association with the displayed logoff button.

3 Claims, 5 Drawing Sheets

FIG. 3

WORLD WIDE WEB RECEIVING DISPLAY STATION WITH A WEB BROWSER GENERATING A GRAPHICAL USER INTERFACE WITH A UNIVERSAL WEB SITE LOGOFF BUTTON ENABLING A BROWSER ROUTINE FOR USER LOGOFF FROM SELECTED WEB SITES

TECHNICAL FIELD

The present invention relates to accessing user entry into Web sites maintained on the World Wide Web (Web), and particularly to ease of use in logging in and especially out of such Web sites.

BACKGROUND OF RELATED ART

The past decade has been marked by a technological revolution driven by the convergence of the data processing industry with the consumer electronics industry. The effect has, in turn, driven technologies that have been known and available but relatively quiescent over the years. A major one of these technologies is the Internet or Web. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of databases providing documents, media and computer programs through related distribution of Web documents, e.g. Web pages or electronic mail. Because of the ease with which documents are distributable via the Web, it has become a major source of data. Virtually all databases of public information throughout the world are accessible and able to be searched via the Web.

The ease with which great volumes of data may be searched from a computer attached to the Internet and equipped with a Web browser has led to the development of widespread electronic commerce over the Web. At the present time, it is becoming very rare to find a business organization of any kind that does not transact some aspect of the business via the Web.

The accessing of data from the Web is in the form of Web documents, e.g. Web pages available from Web sites that maintain databases of information from which such Web documents are formed. This is conventionally done via a Web browser installed at the receiving station that accesses the Web sites. A great many of these Web document transactions can be implemented without requiring the user at a receiving Web display station to login at the Web site providing the transaction in order to receive a Web document. However, where the hosts of the Web sites regard the transactions involving Web documents as more serious or are more protective of their databases, such Web sites require the user requesting documents to login at the Web site. This is particularly the case where electronic commerce is involved. The login may, of course, be any conventional login wherein the user is asked to provide specific information and may have to use an I.D, or password to facilitate login. In serious business and academic pursuits via the Web, it is not unusual for a user in a single session to be logged in to several Web sites. Some of these logins may be cascaded, i.e. the user is logged into a second Web through a first Web site that he initially logged into.

It will, thus, be understood that it would be important for a user who is ending a particular session on the Web to logout of the logged into Web sites. Closing a Web session by a user who leaves some dangling logons, i.e. the user is off the Web but still has not logged off one or more logged on Web sites, can be troublesome to the user who may be charged for logon time or at least be using up logon time allotted to him on a monthly basis. Likewise, it could be troublesome to the Web site hosts who may have to allocate resources to serve the dangling logon. In addition, if the Web site is a secure site, the failure to logoff would present security problems.

SUMMARY OF THE PRESENT INVENTION

The failure of a user to logoff all of the Web sites that he is logged onto when closing a Web session is due in part to the time it takes to individually log off each Web site. This includes finding the logoff button which will have a different format and location from Web document to Web document. Also, the user may have actually lost track of the sites that he is logged onto. The present invention provides an implementation for a user at a receiving Web station keeping track of logged on Web sites and a convenient universal logoff interface button to log off a logged on Web site. In its broadest aspects, the invention involves the combination of an implementation at a receiving display station generating a graphical user interface (GUI) including a universal logout button, means associated with said logout button for enabling a user to select a Web site for logout and means at said receiving station responsive to said selection of a Web site for logging said receiving station out of said Web site. This combination is preferably performed directly in the Web browser. The browser tracks the Web sites that the user is logged onto and, upon interactive request by user, a menu of logged on Web sites is provided in association with the displayed logoff button. Then, by appropriate selection, the user may logoff any or all of the logged on Web sites.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 3 is an illustrative interactive receiving display station showing the receiving display terminal interface including the universal logoff button;

DETAILED DESCRIPTION OF THE PREFERRED EMBODIMENT

Figure 1:
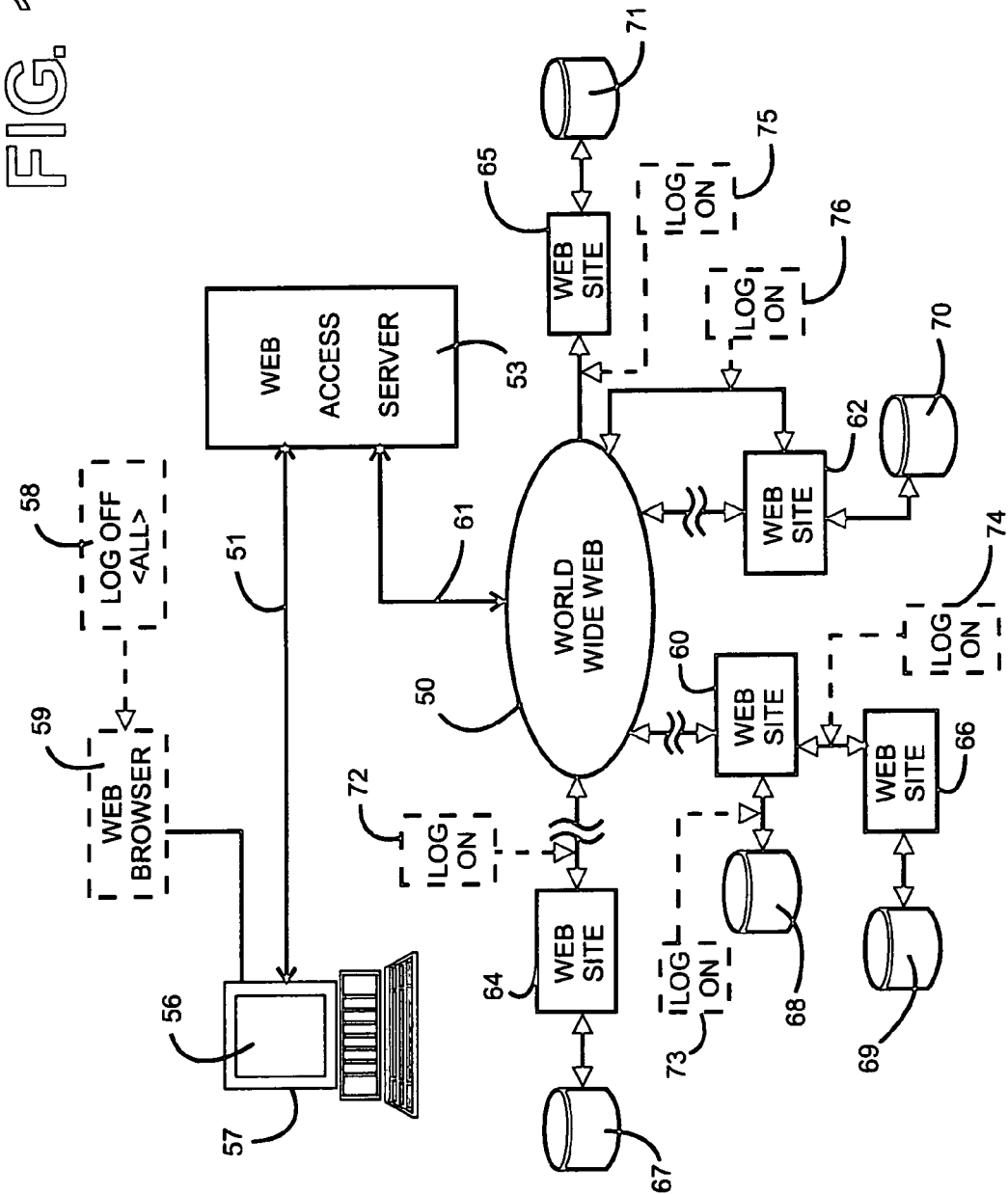
FIG. 1 is a generalized diagrammatic view of a network, e.g. Web portion, to illustrate how the receiving display terminal user may be logged on a plurality of Web sites in accordance with the present invention.

Referring to FIG. 1, there is shown a very generalized diagram of a Web portion on which the present invention may be implemented. In the examples that follow, we will use the Web as the computer controlled object oriented programming network system. Actually, the present invention may be implemented on any appropriate network for handling requests from a receiving network display station for information documents from other network sites requiring logon. Receiving client or user computer stations 57, having a user interactive display interface 56, controlled by a conventional Web browser program 59 is typically connected to the Web 50 via standard Web wired connections 51 through Web access server 53 that may be provided by a commercial service provider via connections 61. Reference may be made to the text, *Mastering the Internet*, G. H. Cady et al., published by Sybex Inc., Alameda, Calif., 1996, particularly pp. 136-147, for typical connections between receiving display stations to the Web 50 via access server 53 through connection 51. For this illustration, the user at terminal 57 has been connected via browser 59 to Web sites 60, 64, 66, 62 and 65 that respectively maintain databases 67 through 71. The user has had to logon via respective logon programs 72-76. It should be noted that two of the logons, 73 and 74, are respectively cascaded through cascaded Web sites 60 and 66, i.e. the logon to Web site 66 has to go through Web site 60. The program routine 58 of the present invention is incorporated in Web browser 59. The universal logoff button in the interface 56 of receiving display station 57, to hereinafter be described in greater detail, is maintained by Web browser 59.

Before going further into the details of specific embodiments, it will be helpful to understand from a more general perspective the various elements and methods that may be related to the present invention. Since an aspect of the present invention is directed to Web documents, such as Web pages transmitted over networks, an understanding of networks and their operating principles would be helpful. We will not go into great detail in describing the networks to which the present invention is applicable. The Internet or Web is a global network of a heterogeneous mix of computer technologies and operating systems. Objects are linked to other objects in the hierarchy through a variety of network server computers. These network servers are the key to network distribution, such as the distribution of Web pages and related documentation. In this connection, the term "documents" is used to describe data transmitted over the Web or other networks and is intended to include Web pages with displayable text, graphics and other images.

Web documents are conventionally implemented in HTML language, which is described in detail in the text entitled *Just Java*, 2nd Edition, Peter van der Linden, Sun Microsystems, 1997, particularly at Chapter 7, pp. 249-268, dealing with the handling of Web pages; and also in the aforementioned text *Mastering the Internet*, particularly at pp. 637-642, on HTML in the formation of Web pages.

In addition, aspects of this invention will involve Web browsers. A general and comprehensive description of browsers may be found in the above-mentioned *Mastering the Internet* text at pp. 291-313. More detailed browser descriptions may be found in the text *Internet: The Complete Reference, Millennium Edition*, M. L. Young et al., Osborne/McGraw-Hill, Berkeley Calif., 1999: Chapter 19, pp. 419-454, on the Netscape Navigator; Chapter 20, pp. 455-494, on the Microsoft Internet Explorer; and Chapter 21, pp. 495-512, covering Lynx, Opera and other browsers.

Figure 2:
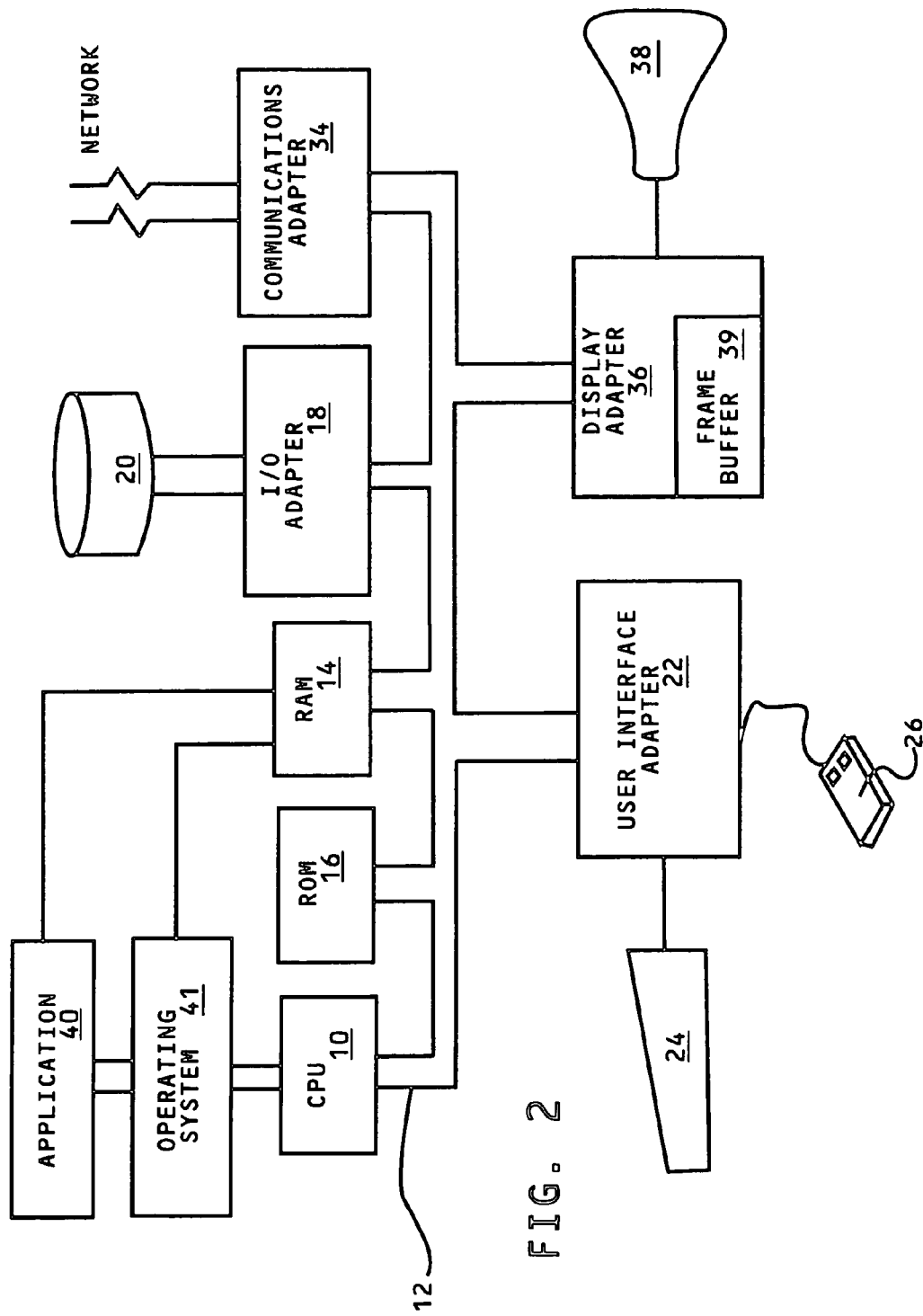
FIG. 2 is a block diagram of a data processing system including a central processing unit and network connections via a communications adapter that is capable of functioning both as a server computer and a receiving display station on the Web portion of FIG. 1.

Referring to FIG. 2, a typical data processing unit is shown that may function as the receiving or client display station 57 for receiving the Web documents from Web sites, and for appropriately logging on the Web sites when required. A central processing unit (CPU) 10, such as one of the PC microprocessors or workstations, e.g. eServer pSeries available from International Business Machines Corporation (IBM) or Dell PC microprocessors, is provided and interconnected to various other components by system bus 12. An operating system 41 runs on CPU 10, provides control and is used to coordinate the function of the various components of the computer of FIG. 2. Operating system 41 may be one of the commercially available operating systems, such as IBM's AIX or Microsoft's WindowsXP™ or Windows 2000™, as well as UNIX and other IBM AIX operating systems. Application programs 40, controlled by the system, are moved into and out of the main memory Random Access Memory (RAM) 14. These programs include Web browser programs of the present invention that include the universal logoff function on the GUI interface on the display 38 screen, as well. These functions will be described hereinafter in combination with conventional Web browsers (browsers 49, FIG. 1) at client computers, such as Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network. In the server 45, this could be the Web. I/O devices are also connected to system bus 12 via user interface adapter 22 and display adapter 36. Keyboard 24 and mouse 26 are all interconnected to bus 12 through user interface adapter 22.

Display adapter 36 includes a frame buffer 39 that is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
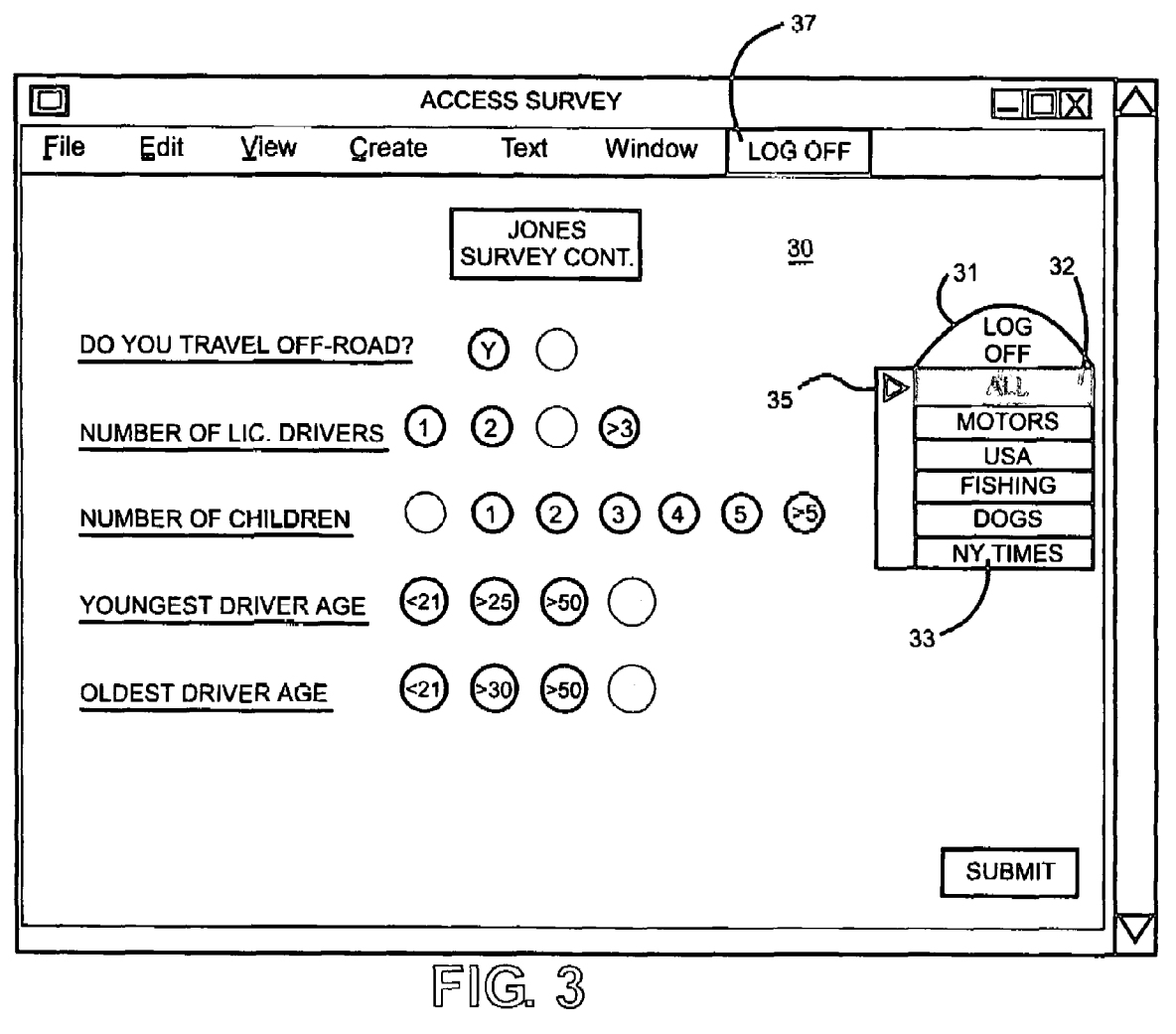

Now, with respect to FIG. 3, the universal logoff button of the present invention will be illustrated. An illustrative interactive receiving display station with the receiving display terminal interface 30, including the universal logoff button 31, is shown. Irrespective of what is currently being displayed on the display screen 30, if a Web site has been logged onto, then logout button 31 will appear, always in the same position. The position is determined by the Web browser layout control and not by the layout and content of the Web document. This indicates that one or more Web sites have been logged onto. The button 31 will remain as long as there is at least one Web site that is still logged on. Adjacent to the universal logoff button 31 is a drop down menu 33 that can be opened by the user, e.g. by clicking once on the button 31. The user, by scrollable pointer 35, may then select one or more of the listed sites on the list. In the present example, the user has selected "All" in which case when the user then further selects the logoff button 31, the Web browser will commence a routine that will log the user off all logged on Web sites.

Figure 4:
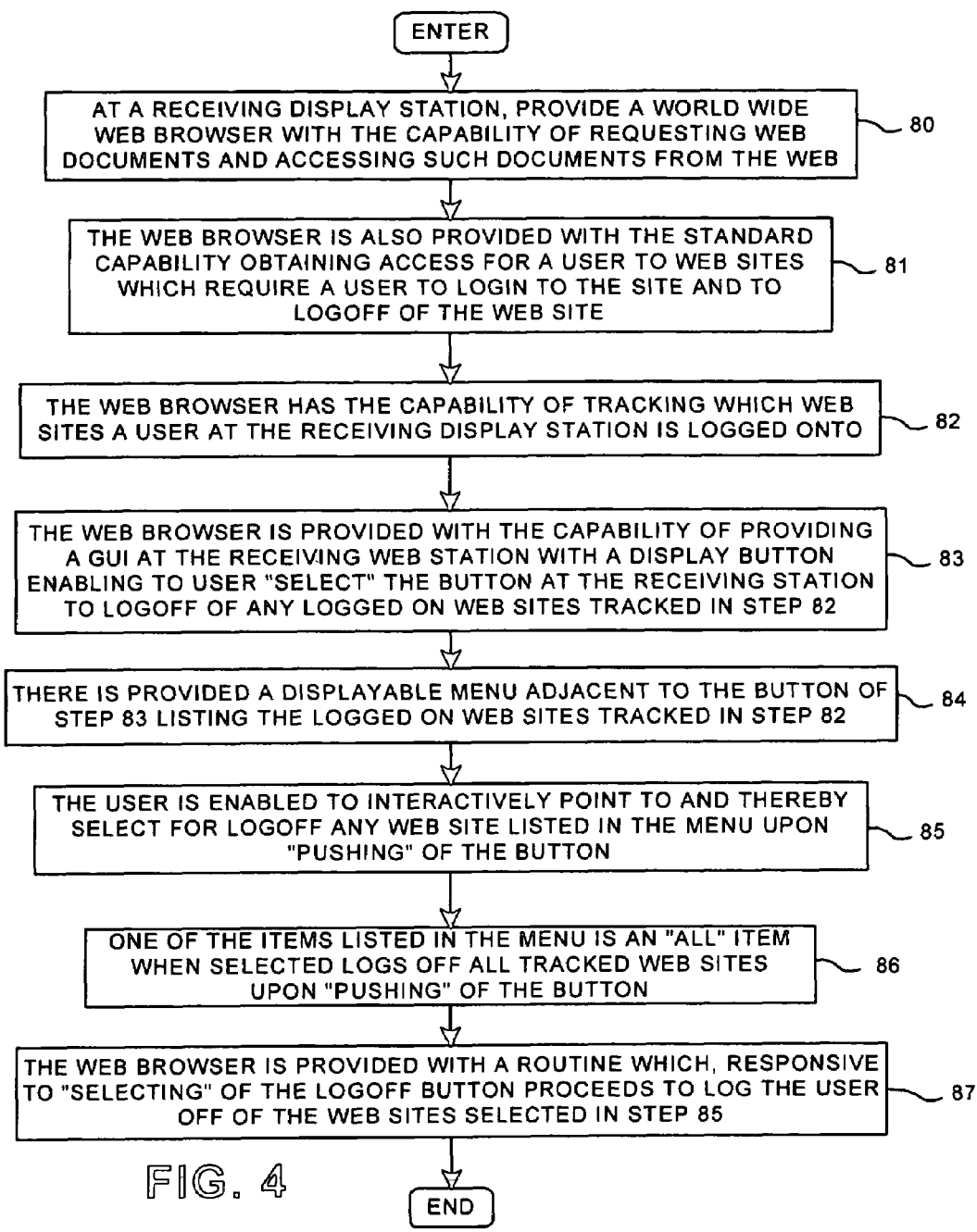
FIG. 4 is an illustrative flowchart describing the setting up of the elements of the present invention for the provision of a universal logoff button at the receiving display station.

FIG. 4 is a flowchart showing the development of a process according to the present invention for the development of a universal Web site logoff button in a GUI or API (Application Program Interface) at the user receiving display station on the Web and incorporated in the Web browser for that receiving display station. At a receiving display station, there is provided a Web browser with the conventional capability of requesting Web documents and accessing such documents from the Web, step 80. In addition, the Web browser is provided with the standard capability of obtaining access for a user to Web sites that requires a user to login at the site and to logoff the site when completed, step 81. The Web browser is provided with the capability of tracking which Web sites a user at the receiving display station is logged onto, 82. The Web browser is provided, step 83, with the further capability of providing a GUI at the receiving Web station with a universal logoff button that enables the user to select the button at the receiving station to thereby logoff from any and all logged on Web sites tracked in step 82. There is further provided, step 84, on the GUI interface adjacent to the logoff button, a menu listing the logged on Web sites tracked in step 83. The user at the receiving display station is enabled to interactively point to and thereby select for logoff any Web site listed in the menu when the button is selected, step 85. The menu also includes a listed "All" item that when selected enables the routine to logoff from all logged on Web sites, step 86. The Web browser is also provided, step 87, to include a routine that is responsive to the selecting of the logoff button and proceeds to logoff the user from all of the Web sites selected for logoff in step 85.

For this function, this logoff button routine would simply go through the HTML page currently loaded at the receiving display station, and look for <a> (anchor tags) that are labeled with common "logoff" terminology. For example, the following is a sample Web page that contains a logout <a> (anchor tag):

```
<html>
<head>
    <title>MyPage</title>
</head>
<body>
<ahref="./menu1.jsp">menu1</a>
<ahref="./menu2.jsp">menu2</a>
<ahref="./logout.jsp">logout</a>
<body/>
<html/>
```

Thus, when the user clicks on the Web browser supported logoff button, it would see the <a> tag that contains the text of "Logoff", and then send that command to the appropriate server. In the case that the logout command is in an HTML button, the browser would simulate the clicking of the logoff button. For example:

```
<html>
<head>
    <title>MyPage</title>
</head>
<body>
<form action="./logoff.jsp">
    <input type="button" name ="logoff"
    value="logoff"></input>
</form>
</body>
</html>
```

The browser will find the button value "logoff" and execute the button as if the user clicked on it.

It will be understood that with this Web browser layout logoff button, there will still remain the additional conventional logoff button provided in the Web document containing the button. The user or Web browser designer may provide for ab overrride with the Web browser universal logoff button as the default button. Alternatively, both the Web document logoff button and the browser supported universal logoff button may be permitted to remain operative.

Figure 5:
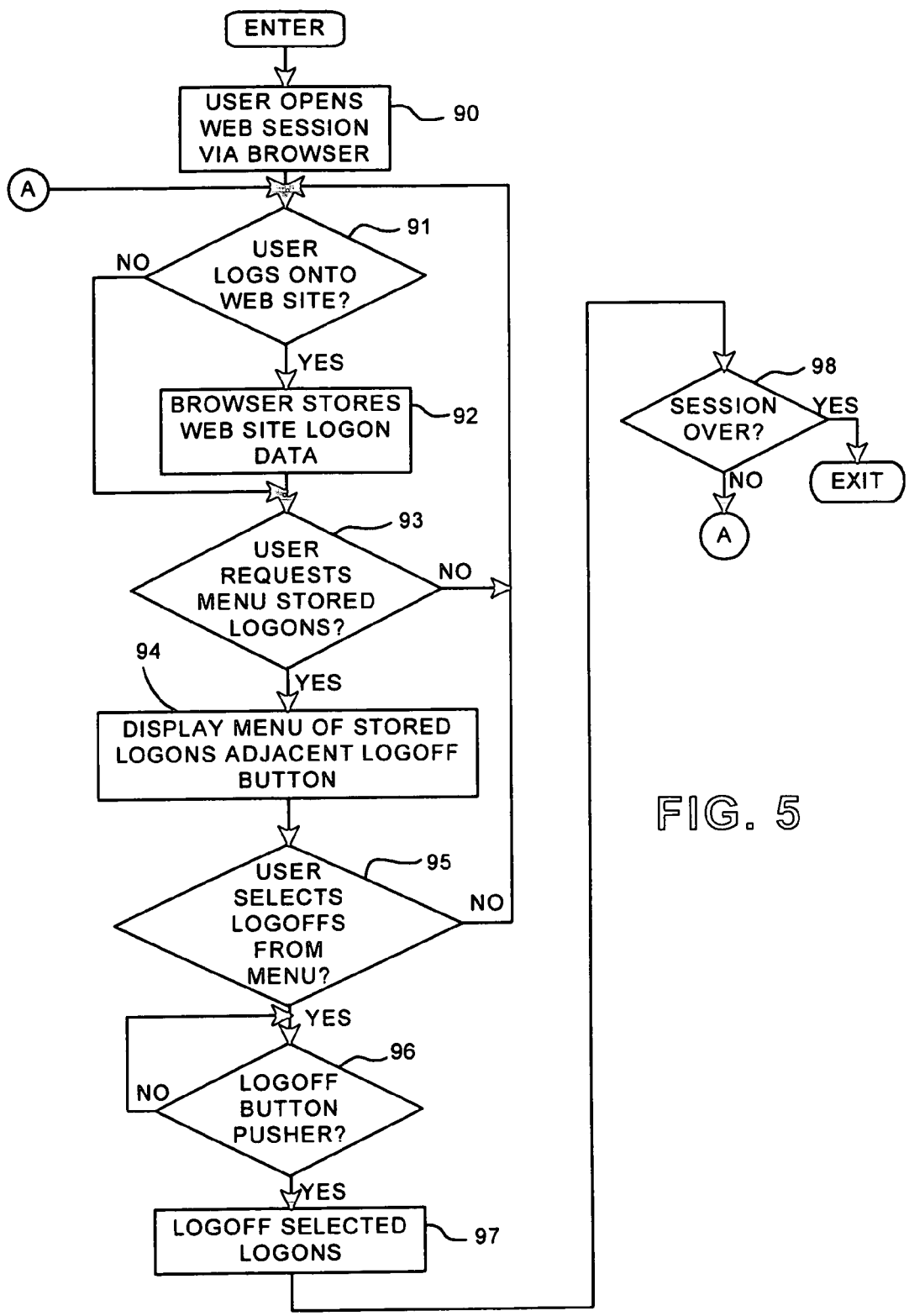
FIG. 5 is a flowchart of an illustrative run of the universal logoff program set up in FIG. 4.

The running of the process set up in FIG. 4 will now be described with respect to the flowchart of FIG. 5. The user opens a Web session via the Web browser, step 90. A determination is made, step 91, as to whether the user has logged onto a Web site. If Yes, the browser has the Web site logon data stored in a cache at the user station associated with the Web browser, step 92. Then, or if the decision from step 91 is No, a further determination is made as to whether the user has requested that the menu of stored logons be displayed, step 93. If Yes, the menu is displayed adjacent to the logoff button on the receiving display station interface, step 94. Then, step 95, a further decision is made as to whether the user has selected any items to be logged off from the logoff menu. If No, the process is returned to step 91, and the Web session continued. If Yes, then a further decision is made as to whether the user has pushed the logoff button, step 96. If Yes, the browser proceeds with its routine to logoff the Web sites of all of the selected stored logon menu, step 97. This may be accomplished by the Web browser preceding sequentially through the Web sites to be logged off, and in each case, sending an appropriate signal to the respective Web site which signal would be interpreted at the Web site as equivalent to a logoff signal from a Web document indicating that the user has selected the conventional logoff button in the Web document.

At this point a decision may conveniently be made as to whether the session is over, step 98. If Yes, then the session is exited. If No, the session is returned via branch "A" to step 91, and the Web session continued.

One of the preferred implementations of the present invention is in application program 40, i.e. a browser program made up of programming steps or instructions resident in RAM 14, FIG. 2, of a client display station and/or server during various operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted network such as the Web itself, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a Web communication network with user access via a plurality of data processor controlled interactive receiving display stations for displaying received Web documents available from Web source sites on the Web, a method for expediting the logoff at receiving display stations from Web sites logged onto by said receiving stations for receiving Web documents comprising:

generating a GUI including a universal logoff button at a receiving display station;

displaying a menu listing a plurality of Web sites that said receiving display station is logged onto in response the selection of said logoff button;

enabling a user to select at least one Web site for logoff from said menu; and responsive to said selection of at least one Web site, logging said receiving station off of said at least one Web site; and enabling a user to select an item from the menu enabling said receiving station to logoff of all Web sites logged onto.

2. The Web method for expediting logoff of claim 1 wherein:
- said receiving station is logged onto an end Web site through at least one intermediate Web site logged onto Web site; and
- said logoff cascades through said intermediate Web site.

3. The Web method for expediting logoff of claim 1 wherein said receiving station is logged onto an end Web site though at least one intermediate Web site logged onto Web site.

* * * * *